United States Patent [19]

Mestdagh et al.

[11] Patent Number: 4,641,747
[45] Date of Patent: Feb. 10, 1987

[54] LATCHING STORAGE CASE FOR A HOLDER CONTAINING AN INFORMATION CARRIER

[75] Inventors: Gilbert E. Mestdagh; Ghislanus M. A. M. Aldenhoven, both of Eindhoven, Netherlands

[73] Assignee: U.S. Philips Corporation, New York, N.Y.

[21] Appl. No.: 730,223

[22] Filed: May 3, 1985

[30] Foreign Application Priority Data

May 14, 1984 [NL] Netherlands ........................ 8401546

[51] Int. Cl.$^4$ ..................... A47B 88/04; B65D 85/672
[52] U.S. Cl. .................................. 206/309; 206/387; 206/444; 220/346; 312/12
[58] Field of Search ............... 206/309, 387, 444, 445; 312/10, 12, 15, 16, 18, 19, 319, 333; 220/346

[56] References Cited

U.S. PATENT DOCUMENTS 3,854,784 12/1974 Hunt et al. ........................... 312/10
3,995,737 12/1976 Ackeret ............................... 312/15
4,235,490 11/1980 Schwartz et al. .................... 312/18
4,239,109 12/1980 Nielson et al. ...................... 206/387
4,270,817 6/1981 Mcrae .................................. 312/8

*Primary Examiner*—William Price
*Assistant Examiner*—Jimmy G. Foster
*Attorney, Agent, or Firm*—David R. Treacy

[57] ABSTRACT

A storage case and holder combination has an ejection spring which urges an inserted holder outward. The holder is retained by a resilient latching arm having a pin which engages in a latching groove that deflects the pin in two orthogonal directions during insertion and latching. To keep the pin from resiliently moving out of the groove in response to a pull on the holder, a stop on the storage case prevents movement of the pin in the undesired direction while the holder is in the latched position. The latching arm and ejection spring are formed as a unitary molding with a cover portion which attaches to, and preferably forms part of, the rear wall of the case when shaped into position.

8 Claims, 5 Drawing Figures

LATCHING STORAGE CASE FOR A HOLDER CONTAINING AN INFORMATION CARRIER

BACKGROUND OF THE INVENTION

The invention relates to a storage case for a holder containing at least one information carrier, the storage case having a receptacle into which the holder can be inserted from the front of the case. A blade spring, of which at least an active portion is situated in the receptacle, urges an inserted holder outward in an ejection direction. A latching arm with a free end portion also carries a latching pin which projects into the receptacle, to engage a latching projection on the holder after insertion of the holder, and to latch the holder inside the storage case, against the ejection force which is exerted on the holder by the blade-spring in a direction opposite to the direction of insertion.

A storage case of the above type is disclosed in U.S. Pat. No. 3,854,784. In this known case the receptacle contains both a spring-steel blade spring and a pivotal latching arm which is loaded by a torsion spring in order to enable the holder to be latched in the receptacle and, after pressure has again been exerted in the direction of insertion, to enable the holder to be released and to be slid out in the opposite direction by the blade spring. Because of these operations such a latching and release system is referred to as a "push-push" system. This system is suitable for the rapid insertion, removal and latching of information carriers, such as records, owing to these simple operations. In the known case the "push-push" system is constructed by means of the above-mentioned parts which have to be mounted separately in the case. This construction makes the known case fairly expensive. As a result, the known case is not very suitable as a storage system for storing mass-produced disc records intended for home-entertainment use, for example those of the "compact disc" type.

SUMMARY OF THE INVENTION

The object of the invention is to construct a storage case of the type set forth in the opening paragraph in such a way that it comprises a minimum number of parts and is thus particularly suitable for mass-production.

To this end the invention is characterized in that the blade spring, the latching arm and the latching pin are constructed as an integral unit made of an elastic material, which unit is connected to a rear wall of the case by snap-fastening means. Thus, the storage case comprises a first part comprising the case walls and the receptacle and a second part comprising the integral unit which comprises the blade spring, the latching arm and the latching pin. In this way the number of parts of the case can be limited to two, which parts are preferably injection-molded from a plastic. Thus, the case can be assembled by assembling these two parts, in a minimum of time. This assembly time and the cheap method of manufacturing these two parts result in a low cost of the case in accordance with the invention, while the holder is easy to slide in and out, is latched properly and provides a satisfactory protection of the information carrier inside the case. As a result of this, the case is particularly suitable for the storage of mass-produced information carriers such as optically readable audio records of the "Compact Disc" type. The integral unit has suitable elastic properties, even at high temperatures, when it is made of a polycarbonate plastic material.

It is to be noted that U.S. Pat. No. 4,239,109 describes a storage case in which blade springs are connected to the rear wall of the case by a kind of snap-fastening means. In this known storage case the blade springs clamp the holders behind an edge portion near the front of the case, but in the case of relatively thin holders, such as those for discs, this may eventually lead to deformation of the holders. Moreover, in this known storage case the blade springs are not combined to form an integral unit with latching means for the holders.

A preferred embodiment of the invention is characterized in that in the rear wall an opening is formed in which the integral unit is mounted, and in that the unit also comprises clamping portions which constitute the snap-fastening means and which clamp the unit onto the rear wall of the case. Thus, by mounting the integral unit in the opening in the rear wall of the case and securing this unit by means of the clamping portions on the wall, mounting of the unit is simplified even further.

A further preferred embodiment of the invention is characterized in that the integrated unit further comprises a cover on which the blade spring and the latching arm are supported and which closes the opening, the rear surface of the cover being disposed in a plane containing the rear surface of the rear wall of the case. Thus, in the assembled condition the cover of the unit is flush with the rear wall of the case so that the case does not comprise any portions which project from the rear. The cover of the integral unit can be injection-molded integrally with the unit.

In this respect another embodiment of the invention is characterized in that the case comprises a plurality of receptacles disposed one above another, and the cover extends over substantially the entire height of the case and carries a blade spring and a latching arm at the level of each receptacle. Thus, the integral unit is also suitable for use in a case which is intended to receive a plurality of holders. For example, a storage case which can hold ten holders may be provided with one integral unit which carries the blade springs and latching arms for the ten receptacles.

Two embodiments of a storage case in accordance with the invention will now be described in more detail, by way of example, with reference to the drawing.

DESCRIPTION OF THE PREFERRED EMBODIMENTS

Figure 1:
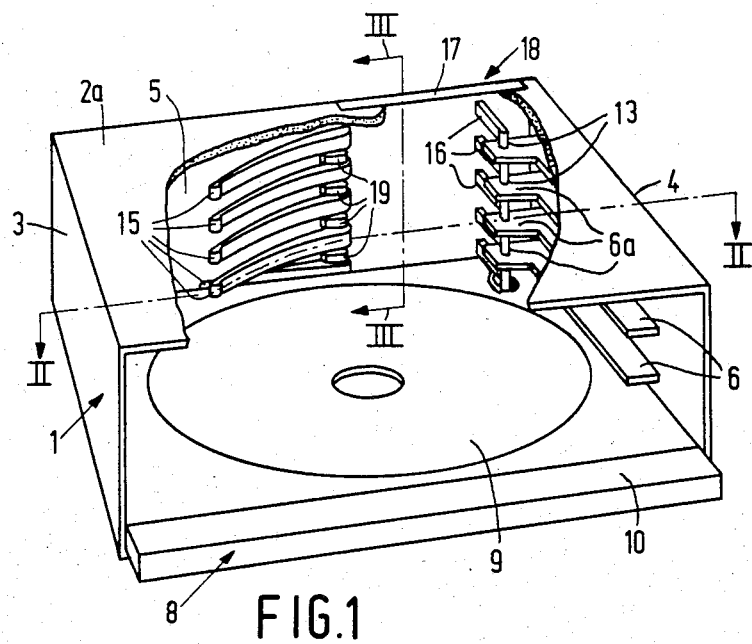
FIG. 1 is a partly cut-away perspective view of a storage case in accordance with the invention with a holder inserted therein.
Figure 2:
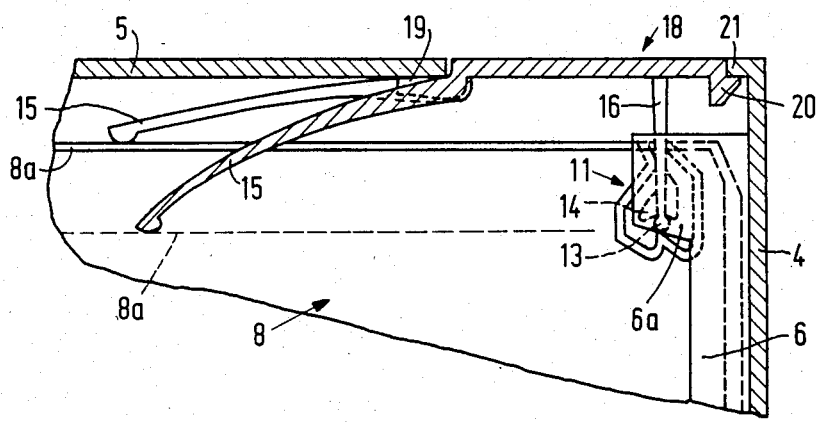
FIG. 2 is an enlarged-scale sectional view taken on the line II—II in FIG. 1, of part of the case shown in FIG. 1.
Figure 3:
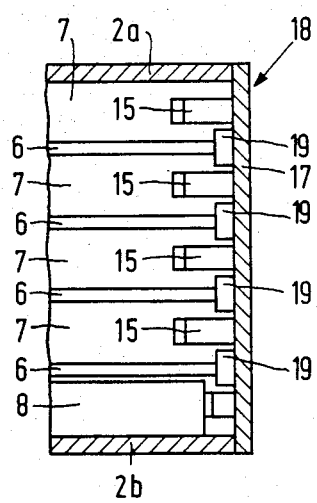
FIG. 3 is a sectional view taken on the line III—III in FIG. 1 and drawn to an enlarged scale.

The storage case shown in FIGS. 1, 2 and 3 comprises a housing have a number of walls, including upper and lower major walls 2a and 2b, side walls 3 and 4, and a rear wall 5. The front of the storage case is open. The side walls 3 and 4 each carry a plurality of bars 6 which extend parallel to the major walls 2a and 2b. Each pair of opposed bars which are situated at equal distances from the major walls forms part of a receptacle 7, the case shown in FIG. 1 comprising five receptacles. It is obvious that the case 1 may be provided with a different number of receptacles, for example ten. The receptacles are each constructed to receive a holder 8. The holder 8 contains an information carrier 9 constituted by a rigid disc. This may be, for example, an optically readable audio record of the "Compact Disc" type. At the front each holder 8 has a grip 10 whose front may carry an information label which provides information about the contents of the information carrier. Thus, the user can readily identify the information carriers contained in the case.

Figure 4:
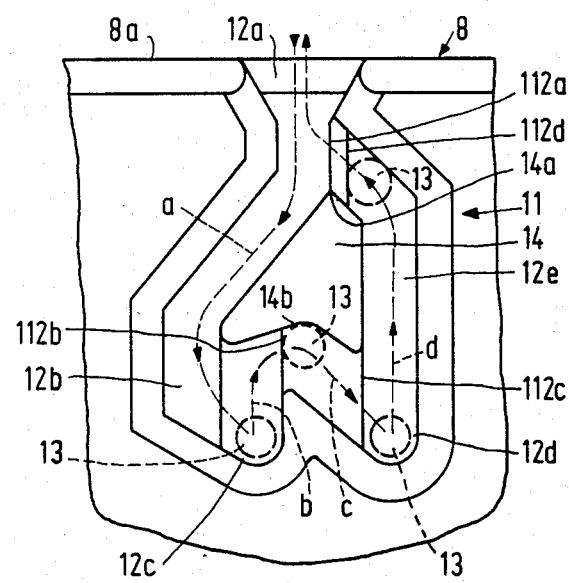
FIG. 4 is an enlarged scale plan view of a portion of the holder shown in FIG. 1, which portion comprises the latching projection.

Near its rear edge 8a the holder 8 comprises a latching groove element 11, which is shown in more detail in FIG. 4. The latching groove element 11 comprises a guide groove 12 in which a latching pin or groove-engaging member 13, which is connected to the case 1 and which will be described more fully hereinafter, can move. The groove 12 has a funnel-shaped inlet-outlet or mouth portion 12a in the rear edge 8a of the holder, which portion 12a has an upwardly inclined bottom wall. When the pin 13 enters the groove through the mouth portion 12a, it slides up a ramp surface 112a and meets a tapered end portion 14a of a latching projection 14, which ramp surface 112a and end portion 14a deflect the pin 13 to the left in a first orthogonal direction perpendicular to the insertion direction, into the left-hand branch or insertion-guiding portion of the groove 12 as viewed in FIG. 4. The upward movement of the member or pin 13 is thus a movement in a second orthogonal direction perpendicular to the insertion and the first orthogonal directions. As a result of this, the pin follows the path a in FIG. 4. This relative movement of the pin 13 is effected when the holder 8 is inserted into the case 1. Subsequently the pin reaches a W-shaped portion 12b of the groove 12, the pin passing along a first outer limb of the W during the last stage of insertion and engaging in a corner portion of the W. This corner portion is constituted by a run-out portion 12c of the groove 12. Under the influence of a blade spring 15 which projects into the receptacle 7 the holder 8 is now urged in a direction opposite to the direction of insertion, so that the pin 13 performs a further relative movement in the groove 12 over a ramp surface 112b. However, since the latching projection 14 is heartshaped, the pin 13 now performs a relative movement in the groove in the direction indicated by an arrow b under the influence of the spring 15. The run-out portion 12c and ramp 112b thus constitute a latching transition portion of the groove 12. Finally, the pin is positioned in a latched position portion of the groove against a latching wall 14b of the latching projection 14, which is the latching position in which the latching projection 14 and the latching pin 13 are latched relative to each other. In this way the inserted holder 8 is effectively latched in the case 1.

The holder can be unlatched simply by pushing the holder 8 again in the direction of insertion, so that the latching pin performs a relative movement as indicated by the arrows c over an unlatching transition portion including a ramp surface 112c towards a corner portion 12d of the groove 12, after which, upon release of the holder, the pin moves along an ejection guiding portion formed by a second outer limb 12e of the groove 12 as indicated by the arrow d. The ramp surfaces 112a, 112b and 112c force the latching pin 13 to follow the groove 12 in the correct direction around the latching projection 14. From the second outer limb 12c the pin 13 runs onto a ramp surface 112d, so that the holder is pushed partly outwards by the spring 15 into the position represented by broken lines in FIG. 2. When the holder 8 is pulled out further by means of the grip 10 the pin is moved over the upwardly inclined wall 112d and the wall 112a, enabling the holder 8 to be removed from the storage case 1. Thus, by again pushing the holder in the direction of insertion the holder can be unlatched. This "push-push" system has the advantage that the user need not perform different operations for latching and unlatching.

Each latching pin 13 is carried by on an elastic latching element or arm 16 which is connected at one end to a cover 17 which extends over substantially the entire height of the case 1. In total the cover 17 carries five such latching arms 16 arranged parallel to and above one another in a row. The cover 17 also carries five blade springs 15 which are situated above one another. The blade springs 15 are each connected at one end to the cover and from there ends the blade springs extend in a direction away from the latching arms 16. Viewed in FIG. 1, the connection of each latching arm 16 to the cover 17 is preferably situated near the right-hand rear corner of the case 1, and the active portions of the blade springs 15 adjacent the free ends thereof act against an inserted holder 8 near the left-hand rear corner of the case.

Owing to their construction the cover 17, the blade springs 15 and the latching arms 16 carrying the latching pins 13 can be manufactured advantageously from a one-piece unitary or elastic material as an integral unit. This is possible by injection-molding the integral unit from a suitable plastic. A particularly suitable plastic is a polycarbonate, which is elastic enough and can withstand comparatively high temperatures. This is important in order to obtain an adequate elasticity of the blade springs 15 and the latching arms 16. Further, this material has the advantage that it enables the housing to be used in environments with comparatively high temperatures. Examples of this are motor cars.

The integral unit bearing the reference numeral 18 in FIGS. 1, 2 and 3 can be attached to the rear wall 8 in an advantageous manner by snap-fastening means. For this purpose the unit 19 comprises four inwardly bent clamping projections 19 and two clamping hooks 20. The four clamping projections 19 are each situated between two adjacent blade springs 15 and the two clamping hooks 20 are each situated near the top and bottom of the case between two adjacent bars 6. As can be seen from FIG. 1, to fit the unit 18, first the projections 19 are slid behind the rear wall 5 of the case 1, after which the unit is snapped into position by pressing the hooks 20 behind an edge portion 21 which forms part of the rear wall 5. The cover 17 is positioned in the inward direction at the top and bottom of the case 1 against the rear edges of the upper and the lower walls 2a and 2b respectively by the snap-fastening means (see FIG. 3) and cannot move further inwards. Preferably, the cover 17 is positioned so that the rear surface of the cover is disposed in a plane containing the rear surface of the rear wall. Thus, a closed and flush rear wall is obtained for the storage case in accordance with the invention.

By constructing the blade springs and the latching arms as an integral unit the case in accordance with the invention is particularly suitable for low-cost mass-production. The number of parts of the case may be limited to only two. The storage case in accordance with the invention is particularly suitable for the storage of information carriers of the "Compact Disc" type, which can be inserted into and removed from the case in accordance with the invention in an easy manner.

Preferably, each bar 6 on the side wall 4 is provided with a stop portion 6a which in the latch portion of an associated one of the pins 13 abuts the upper side of the repective latching arm 16. Thus, the stop portion prevents the pin 13 from being moved upwards in the latched position, for example when the grip 10 of a holder is pulled, and thereby unlatching the holder. In this way the stop portions 6a additionally ensure a correct latching of the holders 8.

Figure 5:
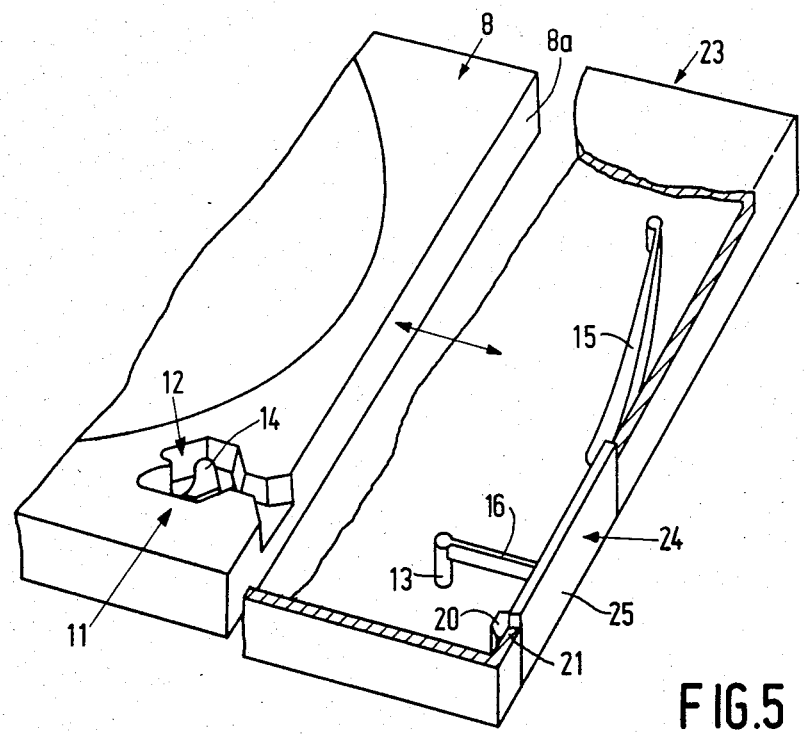
FIG. 5 is a partly cut-away perspective view of a second embodiment of a storage case in accordance with the invention.

As is shown in FIG. 5 it is also possible to employ an integrated unit 24 which comprises a cover 25 with only one blade spring 15, one latching arm 16 and one latching pin 13 in a storage case 23 intended for the storage of only one holder 8. Again, in a manner similar to that shown in FIG. 2, the unit 24 may be connected to the rear wall of the case 23 by snap-fastening means comprising only one clamping hook 20 for clamping the cover 25 against the major walls of the case 23. Preferably, such a case is made of a thin plastic, the present embodiment also comprising only two parts.

What is claimed is:

1. A storage case and holder combination, said holder containing at least one information carrier,
    said case comprising a housing forming at least one receptacle into which said holder can be inserted in an insertion direction from the front of the case,
    spring means for urging a partly inserted holder in an ejection direction opposite said insertion direction, and
    latching means for retaining a fully inserted holder in a latched position; and for unlatching the holder reponsive to pushing said holder inward a given distance from said latched position, so that the holder is ejected in the ejection direction by said spring means; said latching means comprising a latching arm element and a latching groove element, a first of said elements being connected to and forming part of said case, and a second of said elements being connected to and forming part of said holder; said latching arm element having a groove-engaging member which engages said groove upon insertion of the holder to said latched position; and at least one of said elements being resiliently deflectable with respect to said housing, from an initial relative position, in a direction perpendicular to said insertion direction, said elements being resiliently deflectable relative to each other in first and second orthogonal directions perpendicular to each other and perpendicular to said insertion direction,
    characterized in that said groove element comprises an inlet-outlet portion, an insertion guiding portion, a latching transition portion, a latched position portion, an unlatching transition portion, and an ejection guiding portion; and said elements are arranged relative to each other and the housing and insertion direction such that during insertion of a holder to said latched position
    (a) initially each element is in a respective initial position in which said groove-engaging member and inlet-outlet portion are aligned with each other in the direction of insertion,
    (b) next said groove-engaging member and said inlet-outlet portion engage and undergo relative movement until said member engages the first insertion guiding portion,
    (c) next said member engages said insertion guiding portion and said elements undergo relative movement, one of said elements being resiliently deflected in said first orthogonal direction,
    (d) next said member engages said latching transition portion and said elements undergo further relative movement with further inward movement of the holder in said insertion direction until said member engages said latched position portion, during this relative movement said one of said elements resiliently moving in a direction opposite said first orthogonal direction to a relative position in which said one element is unstressed in said first orthogonal direction; during the engagement of the member with at least one of the insertion guiding and latching transition portions, one of said elements being resiliently deflected in said second orthogonal direction such that, when said holder is in the latched position, the member engages the latched position portion under resilient stress in said second orthogonal direction, and the engagement between the member and groove prevents movement of the holder in the ejection direction;
    and upon movement of the holder, from said latched position, further in said insertion direction and then release of said holder:
    (e) said member engages said unlatching transition portion, said elements undergoing further relative movement in said direction opposite said first orthogonal direction and in a direction opposite said second orthogonal direction,
    (f) said member then engages said ejection guiding portion, and said spring means then urges said holder in the ejection direction so that the holder moves partly out of said case, and
    (g) said member engages said ejection guiding portion, and said elements undergo further relative movement in the ejection direction free from further restraint by the latching means.

2. A combination as claimed in claim 1, characterized in that said latching arm is connected to and forms part of said case, and said member is resiliently reflectable with respect to said case in said first and second orthogonal directions,
    said latching groove element is connected to and forms part of said holder, and
    said case comprises a stop portion which, in the initial relative position, is spaced in said second orthogonal direction from said member; and which is so arranged that, when the holder is in the latched position and said member engages said latched position portion, said member abuts said stop thereby preventing further movement of said member in said second orthogonal direction.

3. A combination as claimed in claim 1, characterized in that said latching arm is connected to and forms part of said case, and said member is resiliently reflectable with respect to said case in said first and second orthogonal directions,
    said latching groove element is connected to and forms part of said holder, and
    said spring means, latching arm and member are a one-piece unitary unit made of an elastic material, and further comprise snap-fastening means for connecting said unit to said housing.

4. A combination as claimed in claim 3, characterized in that said housing has a rear wall having an opening, said unit connecting two and closing said opening, said snap-fastening means engaging said rear wall.

5. A combination as claimed in claim 3, characterized in that said case has a plurality of receptacles disposed one above another in said second orthogonal direction, said opening extends over substantially the entire height of the case, and said unit comprises a respective blade spring, forming said spring means, and latching arm at the level of each receptacle.

6. A combination as claimed in claim 4, characterized in that said case comprises a stop portion which, in the initial relative position, is spaced in said second orthogonal direction from said member; and which is so arranged that, when the holder is in the latched position and said member engages said latched position portion, said member abuts said stop thereby preventing further movement of said member in said second orthogonal direction.

7. A storage case and holder combination, said holder containing at least one information carrier, said case comprising a housing forming at least one receptacle into which said holder can be inserted in an insertion direction from the front of the case, spring means for urging a partly inserted holder in an ejection direction opposite said insertion direction, and latching means for retaining a fully inserted holder in a latched position; and for unlatching the holder responsive to pushing said holder inward a given distance from said latched position, so that the holder is ejected in the ejection direction by said spring means; said latching means comprising a resilient latching arm element connected to and forming part of said case, and a latching groove element connected to and forming part of said holder, at least a portion of said groove having a groove bottom surface; said latching arm element having a groove-engaging member which engages said groove upon insertion of the holder into the case, said groove having a latched position portion which said member engages when the holder is in said latched position, said member and groove being arranged such that the member prevents movement of the holder in the ejection direction from the latched position; said arm being resiliently deflectable relative to said case in first and second orthogonal directions perpendicular to each other and perpendicular to said insertion direction, characterized in that said elements are arranged relative to each other and the housing and insertion direction such that, said holder being in said latched position, said member is in a latching position engaging said groove bottom surface, engagement with said surface preventing movement of the member in a direction opposite said second orthogonal direction;

upon movement of the holder, from said latched position, further in said insertion direction and then release of said holder, said member is moved from the latching position in a direction opposite said first orthogonal direction and then in a direction opposite said second orthogonal direction, and said case comprises a stop portion arranged to abut said member while the member is in the latching position, to prevent movement of said member in the first orthogonal direction.

8. A combination as claimed in claim 7, characterized in that said case has a plurality of receptacles disposed one above another in said second ortho

* * * * *